United States Patent
Alahyari

(10) Patent No.: US 11,920,515 B2
(45) Date of Patent: Mar. 5, 2024

(54) CONDENSER FOR HYDROGEN STEAM INJECTED TURBINE ENGINE

(71) Applicant: Raytheon Technologies Corporation, Farmington, CT (US)

(72) Inventor: Abbas A. Alahyari, Glastonbury, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 17/744,379

(22) Filed: May 13, 2022

(65) Prior Publication Data

US 2023/0366351 A1    Nov. 16, 2023

(51) Int. Cl.
*F02C 7/141*    (2006.01)

(52) U.S. Cl.
CPC ........ *F02C 7/141* (2013.01); *F05D 2220/323* (2013.01); *F05D 2220/60* (2013.01); *F05D 2260/213* (2013.01); *F05D 2260/2214* (2013.01); *F05D 2260/60* (2013.01)

(58) Field of Classification Search
CPC .... F02C 3/30; F02C 3/305; F02C 6/18; F02C 7/08; F02C 7/10; F02C 7/141; F02C 7/185
See application file for complete search history.

(56) References Cited

U.S. PATENT DOCUMENTS

| 3,657,879 | A * | 4/1972 | Ewbank | F02C 3/34 |
| | | | | 60/39.5 |
| 4,248,039 | A * | 2/1981 | Cheng | F01K 21/047 |
| | | | | 60/39.55 |
| 10,247,408 | B2 * | 4/2019 | Lear, Jr. | F22B 1/1815 |
| 2021/0001269 | A1 | 1/2021 | Klingels | |
| 2021/0207500 | A1 * | 7/2021 | Klingels | F01K 23/10 |
| 2023/0120297 | A1 * | 4/2023 | Butler | H01M 8/04164 |
| | | | | 290/52 |

FOREIGN PATENT DOCUMENTS

| EP | 3048281 A1 | 7/2016 | |
| GB | 2531632 A | 4/2016 | |
| WO | WO-2019223823 A1 * | 11/2019 | B64D 33/04 |

OTHER PUBLICATIONS

European Search Report for European Application No. 23173237.1 dated Sep. 15, 2023.

* cited by examiner

*Primary Examiner* — Thuyhang N Nguyen
(74) *Attorney, Agent, or Firm* — Carlson, Gaskey & Olds, P.C.

(57) ABSTRACT

A propulsion system for an aircraft includes a hydrogen fuel system suppling hydrogen fuel to the combustor through a fuel flow path. A condenser extracts water from a high energy gas flow. The condenser includes a plurality of rotating passages that are disposed within a collector. The passages are configured to rotate about a condenser axis to generate a transverse pressure gradient to direct water out of the high energy gas flow toward the collector.

20 Claims, 4 Drawing Sheets

CONDENSER FOR HYDROGEN STEAM INJECTED TURBINE ENGINE

TECHNICAL FIELD

The present disclosure relates generally to a hydrogen powered aircraft propulsion system and, more particularly to hydrogen steam injected and intercooled turbine engine.

BACKGROUND

Reduction and/or elimination of carbon emissions generated by aircraft operation is a stated goal of aircraft manufacturers and airline operators. Gas turbine engines compress incoming core airflow, mix the compressed airflow with fuel that is ignited in a combustor to generate a high energy exhaust gas flow. Some energy in the high energy exhaust flow is recovered as it is expanded through a turbine section. Even with the use of alternate fuels, a large amount of energy in the form of heat is simply exhausted from the turbine section to atmosphere. The lost heat reduces the overall efficiency of the engine Turbine engine manufacturers continue to seek further improvements to engine performance including improvements to reduce environmental impact while improving propulsive efficiencies.

SUMMARY

A propulsion system for an aircraft according to an exemplary embodiment of this disclosure, among other possible things includes a core engine that includes a core flow path where air is compressed in a compressor section, communicated to a combustor section, mixed with a hydrogen based fuel and ignited to generate a high energy gas flow that is expanded through a turbine section. A hydrogen fuel system is configured to supply hydrogen fuel to the combustor through a fuel flow path. A condenser is arranged along the core flow path and is configured to extract water from the high energy gas flow. The condenser includes a plurality of rotating passages that are disposed in a collector. The passages are configured to rotate about a condenser axis to generate a transverse pressure gradient to direct water out of the high energy gas flow toward the collector. An evaporator is arranged along the core flow path and is configured to receive a portion of the water that is extracted by the condenser to generate a steam flow. The steam flow is injected into the core flow path upstream of the turbine section.

In a further embodiment of the foregoing, the condenser is configured to receive a cooling flow to cool the high energy gas flow.

In a further embodiment of any of the foregoing, the condenser is configured to receive the cooling flow at a location along an outer periphery.

In a further embodiment of any of the foregoing, the plurality of rotating passages include a plurality of spiral layers that extend axially about a condenser axis.

In a further embodiment of any of the foregoing, the plurality of spiral layers include openings that are configured to exhaust water that is collected from the high energy gas flow to the collector.

In a further embodiment of any of the foregoing, the condenser includes a plurality of axial passages and a plurality of transition passages for directing the high energy gas flow into the rotating passages.

In a further embodiment of any of the foregoing, the propulsion system includes a shaft that is disposed along the condenser axis for supporting rotation of the rotating passages.

In a further embodiment of any of the foregoing, the propulsion system includes a motor that is coupled to the shaft and is configured to drive rotation of the rotating passages.

In a further embodiment of any of the foregoing, the plurality of rotating passages is configured to rotate about the shaft in response to an axial momentum of the high energy gas flow.

In a further embodiment of any of the foregoing, the plurality of rotating passages include a hydrophilic coating.

In a further embodiment of any of the foregoing, the plurality of rotating passages include a hydrophobic coating.

In a further embodiment of any of the foregoing, the plurality of rotating include a textured surface.

In a further embodiment of any of the foregoing, the propulsion system includes a water storage tank and the collector is configured to communicate water that is extracted from the high energy gas flow to the water storage tank.

A water recovery system for an aircraft propulsion system, the water recovery system according to an exemplary embodiment of this disclosure, among other possible things includes a condenser that is arranged along a core flow path of a propulsion system and is configured to extract water from a high energy gas flow. The condenser includes a plurality of rotating passages that are disposed in a collector. The passages are configured to rotate about a condenser axis to generate a transverse pressure gradient to direct water out of the high energy gas flow toward the collector. A water storage tank is in communication with the collector that is configured to receive water that is extracted from the high energy gas flow to the water storage tank. The water recovery system includes at least one water pump for communicating water from the water storage tank to the propulsion system.

In a further embodiment of the foregoing, the condenser is configured to receive a cooling flow to cool the high energy gas flow within the plurality of rotating passages.

In a further embodiment of any of the foregoing, the plurality of rotating passages are defined between a plurality of curved layers that extend axially and curve about a condenser axis.

In a further embodiment of any of the foregoing, the water recovery system includes a shaft that supports the plurality of rotating passages for rotation about the condenser axis.

In a further embodiment of any of the foregoing, the water recovery system includes a motor that is coupled to the shaft to drive rotation of the plurality of rotating passages.

In a further embodiment of any of the foregoing, the plurality of rotating passages include at least one of a hydrophilic coating, a hydrophobic coating or a textured surface.

A method of operating an aircraft propulsion system according to an exemplary embodiment of this disclosure, among other possible things includes generating a high energy gas flow that includes water, removing water from the high energy gas flow with a rotating portion of a condenser that is disposed in a flow path downstream from a combustor, generating a steam flow from water removed from the high energy gas flow with an evaporator that is located within the flow path upstream of the condenser and downstream of the combustor, and injecting the generated steam with a core flow path.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
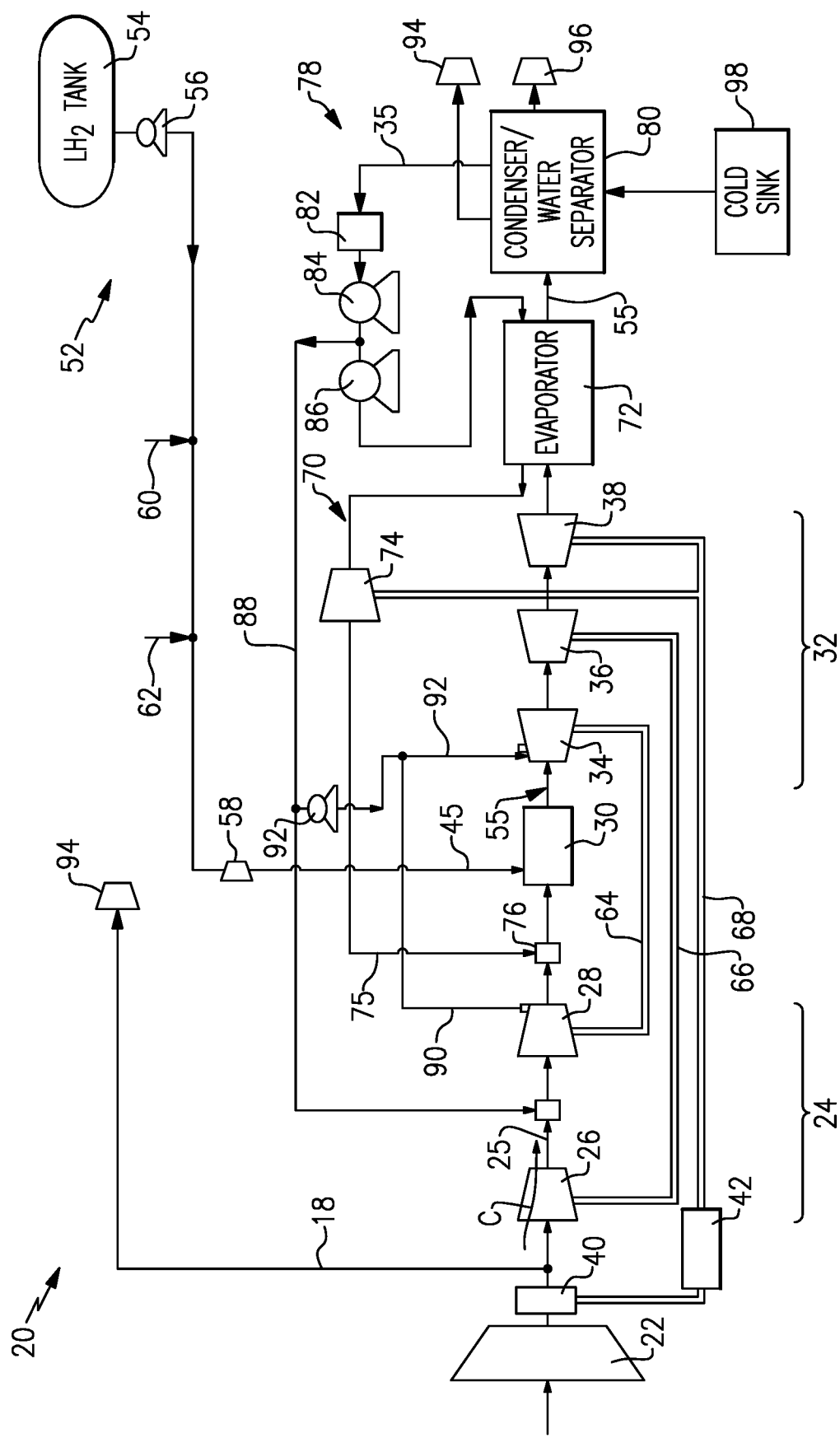
FIG. 1 is a schematic view of an example propulsion system embodiment.

FIG. 1 schematically illustrates an aircraft propulsion system in the form of an example hydrogen steam injected inter-cooled turbine engine that is generally indicated at 20. The engine 20 includes a core engine with a core airflow path C through a fan 22, a compressor section 24, a combustor 30 and a turbine section 32. The fan 22 drives inlet air as a core flow 25 into the compressor section 24. In the compressor section 24, the core flow 25 is compressed and communicated to a combustor 30. In the combustor 30, the core flow 25 is mixed with a hydrogen ($H_2$) fuel flow 45 and ignited to generate a high energy gas flow 55 that expands through the turbine section 32 where energy is extracted and utilized to drive the fan 22 and the compressor section 24. A bypass flow 18 may flow through the fan 22, bypass the remaining components of the engine 20, and exit through a fan nozzle 94. The high energy gas flow 55 is exhausted from the turbine section 32 and communicated to a steam generation system 70 and a water recovery system 78 before being exhausted through a core nozzle 96.

The engine 20 is configured to burn hydrogen provide by a fuel system 52. The fuel system 52 includes a liquid hydrogen ($LH_2$) tank 54 in communication with at least one pump 56. The pump 56 drives a fuel flow 45 to the combustor 30. $LH_2$ provides a thermal heat sink that can be utilized to cool various heat loads within the aircraft indicated at 60 and in the engine as indicated at 62. The heat loads may include, for example and without limitation, super conducting electrics, a working fluid of an environmental control system of the aircraft, an air conditioning heat exchanger, and engine working fluid heat exchangers. Heat accepted into the hydrogen fuel flow increase the overall fuel temperature prior to injection into the combustor 30.

A hydrogen expansion turbine 58 may be provided to reduce the pressure of the $LH_2$ fuel flow through expansion prior to communication to the combustor 30. Expansion in the expansion turbine 58 provides for the temperatures and pressures of the fuel flow to enter the combustor 30 as a gas and not a liquid.

The steam injection system 70 uses the exhaust heat to generate a steam flow by evaporating high pressure water through an evaporator 72. The generated steam may then be injected into compressed core airflow at a location 76 for communication into the combustor 30 to improve performance by increasing turbine mass flow and power output without additional work required by the compressor section. In one example embodiment the location 76 is upstream of the combustor 30. Steam flow from the evaporator 72 may drive a steam turbine 74 to provide an additional work output prior to injection into the combustor 30.

The water recovery system 78 draws water, schematically indicated at 35, from the high energy gas flow 55 and communicates the recovered water to water storage tank 82. The water storage tank 82 operates as an accumulator to provide sufficient water for operation during various engine operating conditions. A condenser/water separator 80 is provided downstream of the turbine section 32 and the evaporator 72. The condenser/separator 80 is in communication with a cold sink, schematically indicated at 98 for the condenser/separator 80 may be, for example, ram or fan air depending on the application and/or engine configuration.

The engine 20 has an increased power output from the injected steam due to an increasing mass flow through the turbine section 32 without a corresponding increase in work from the compressor section 24. An example engine operation cycle may include up to (or more than) 35% steam-air-ratios (SAR) and may be assisted by a multiple fold (e.g., $2x$, $3x$, etc.) increase in moisture from burning $H_2$ as the fuel.

The water recovery system 78 includes the water storage tank 82 that receives water from the condenser/water separator 80 and provides for the accumulation of a volume of water required for production of sufficient amounts of steam. Water recovered from the exhaust gas flow is driven by a low pressure pump 84 and a high pressure pump 86 to the evaporator 72.

A water intercooling flow 88 may be communicated to the compressor section 24 to reduce a temperature of the core airflow 25 and increase mass flow. Reduced temperatures and increased mass flow provided by injection of water increases compressor efficiency. Water may also be used as a cooling flow 92 to cool cooling air flow 90 communicated from the compressor section 24 to the turbine section 32.

The example compressor section 24 includes a low pressure compressor (LPC) 26 and a high pressure compressor (HPC) 28. The turbine section 32 includes a high pressure turbine (HPT) 34, an intermediate pressure turbine (IPT) 36, and a low pressure turbine (LPT) 38. The turbines 34, 36 and 38 are coupled to a corresponding compressor section. In this disclosed example, the high pressure turbine is coupled by a high shaft 64 to drive the high pressure compressor 28. An intermediate shaft 66 couples the intermediate turbine 36 to the low pressure compressor 26.

A low shaft 68 is coupled to the low pressure turbine 38 and a gearbox 40 to drive the fan 22. The low shaft 68 may further be coupled to an electric machine 42 that is configured to impart and/or extract power into the low shaft 68. The example gearbox 40 is an epicyclical gear train, such as a planetary gear system, star gear system or other known gear system, with a gear reduction ratio of greater than about 2.3.

Although the example engine 20 is described and shown by way of example as a three spool engine, other engine configurations, such as two-spool may also benefit from this disclosure and are within the contemplation and scope of this disclosure.

Figure 2:
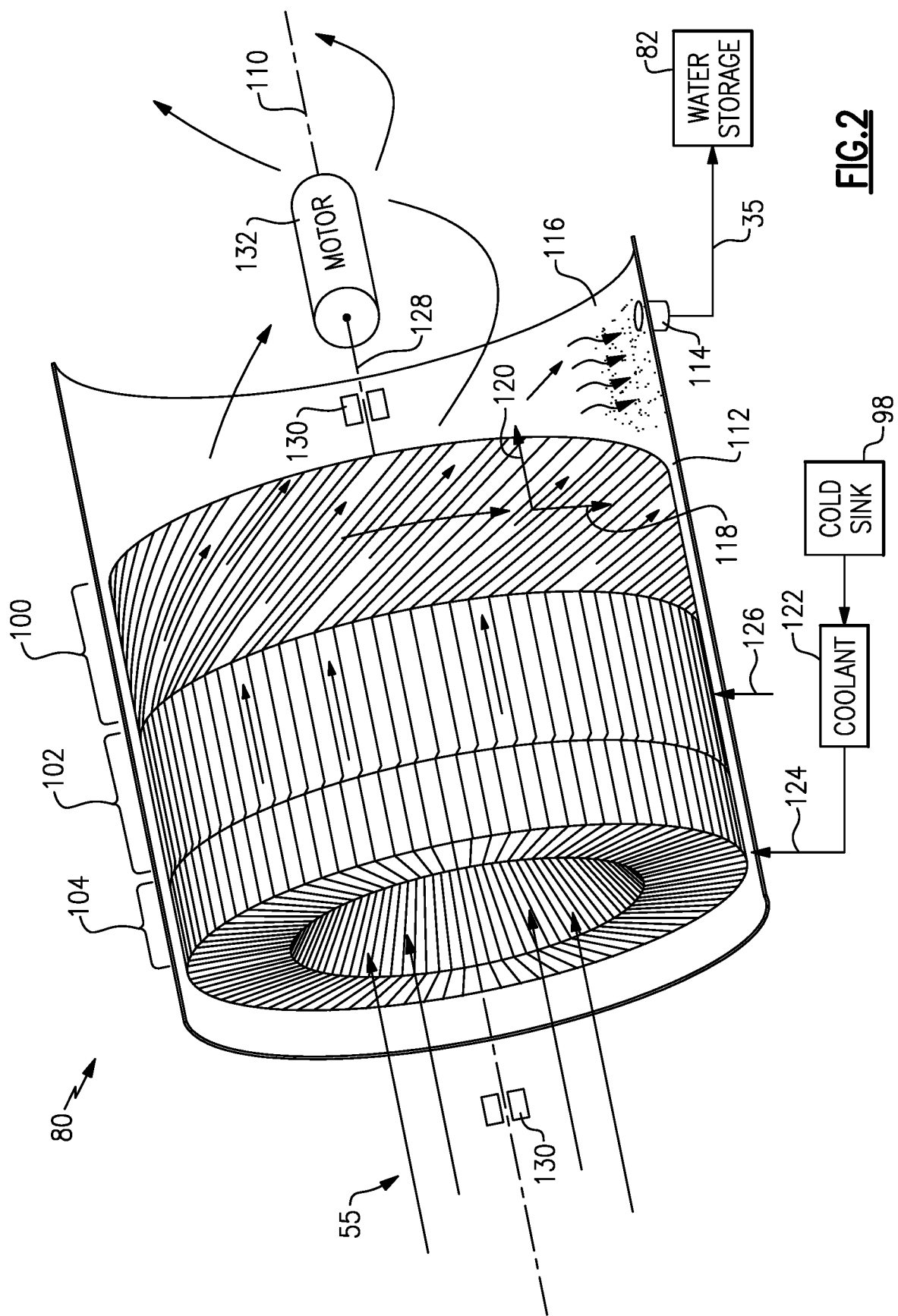
FIG. 2 is a simplified schematic view of an example condenser embodiment.

Referring to FIG. 2, with continued reference to FIG. 1, the example condenser/water separator 80 is schematically shown. The condenser 80 includes a plurality of rotating passages 100 that rotate to induce a centrifugal force on water from the gas flow 55. A coolant flow 124 from a coolant reservoir 122 is placed in thermal communication with the gas flow 55 to transform a portion of steam into liquid water. The liquid water, schematically indicated at 116 is directed by a collector 112 through an opening 114 to the water storage 82. The coolant flow 124 is directed to an outer periphery 126 of the condenser 80 and into thermal communication with the gas flow 55.

The rotating passages 100 are disposed about a condenser axis 110 and supported on a shaft 128. The shaft 128 is supported by bearing systems 130 in one disclosed embodiment. The condenser 80 includes a first axial portion 104 that initially received the gas flow 55. A transition region 102 is disposed between the axil portion 104 and the rotating passages 100. The transition region 102 induces an initial swirl on the incoming gas flow 55. From the transition region, the gas flow 55 enters the rotating passages 100. The gas flow 55 in the rotating passages 100 includes an axial component 120 and a transverse component 118. The transverse component 118 provides for the heavier liquid water to be driven radially outward into the collector 112. The collector 112 surrounds the rotating passages and includes at least one opening 114 for liquid water condensate water flow. It should be appreciated that the collector 112 may include a plurality of openings 114 arranged to capture water flow 116 at various axial and radial locations.

In the disclosed example, a motor 132 is coupled to the shaft 128 to rotate the rotating passages 100. The motor 132 is configured to rotate the passages 100 at a predefined speed determined to generate sufficient centrifugal forces in the direction indicated at 118 to drive liquid water flow 116 outward into the collector 112.

In this example embodiment, the collector 112 is a formed sheet material that substantially surrounds the passages through the axis portion 104, the transition region 102 and the rotating passages 100. The passages through the condenser 80 maybe formed from sheet metal material, as a cast part or by additive manufacturing processes. Moreover, it should be appreciated that it is within the contemplation and scope of this disclosure that the example condenser 80 may be formed using other manufacturing and assembly processes.

Figure 3:
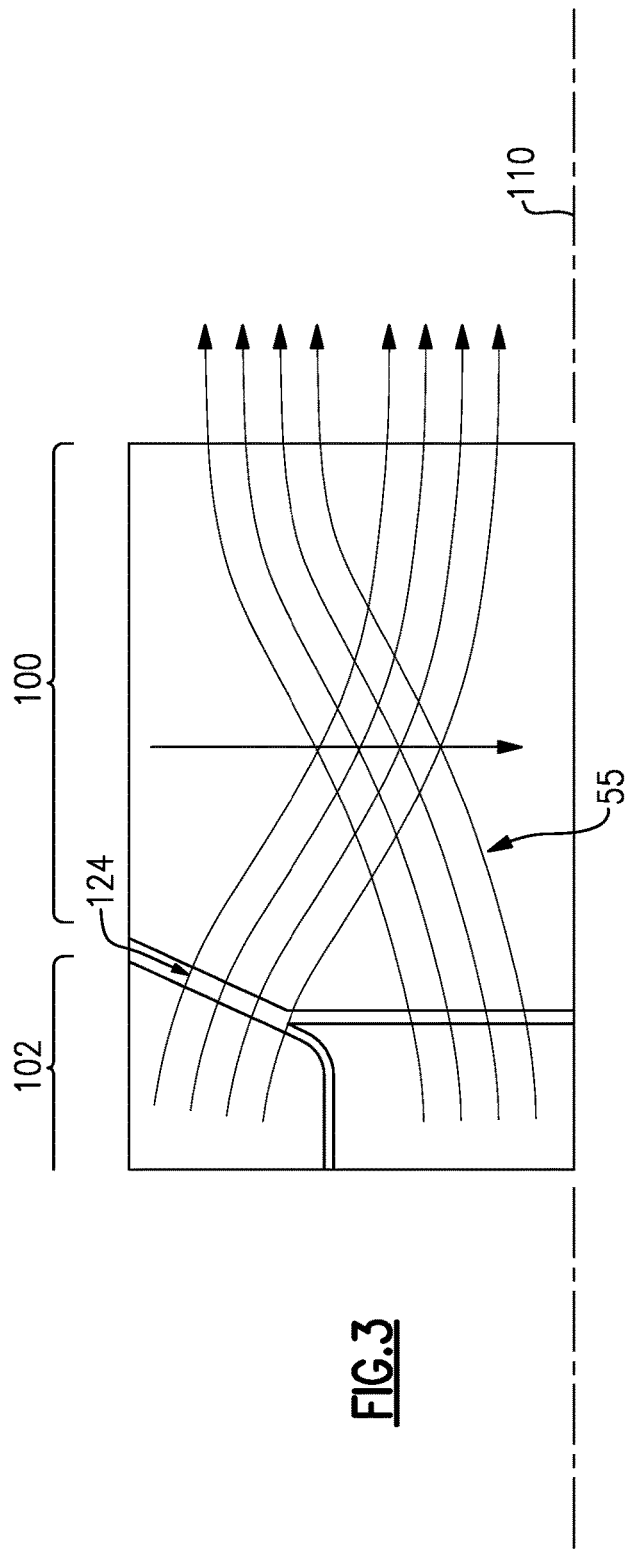
FIG. 3 is a schematic view of gas flow and coolant flows through the example condenser embodiment.

Referring to FIG. 3, with continued reference to FIG. 2, the rotating passages 100 and the transition region are schematically shown with gas flows 55 and the coolant flow 124. In one disclosed embodiment, the gas flow 55 and the coolant flow 124 are maintained separately although in thermal communication. In another disclosed embodiment, the coolant flow 124 is comprised of a coolant that is allowed to mix with exhausted gas flows 55 that are exhausted from the condenser 80.

Figure 4:
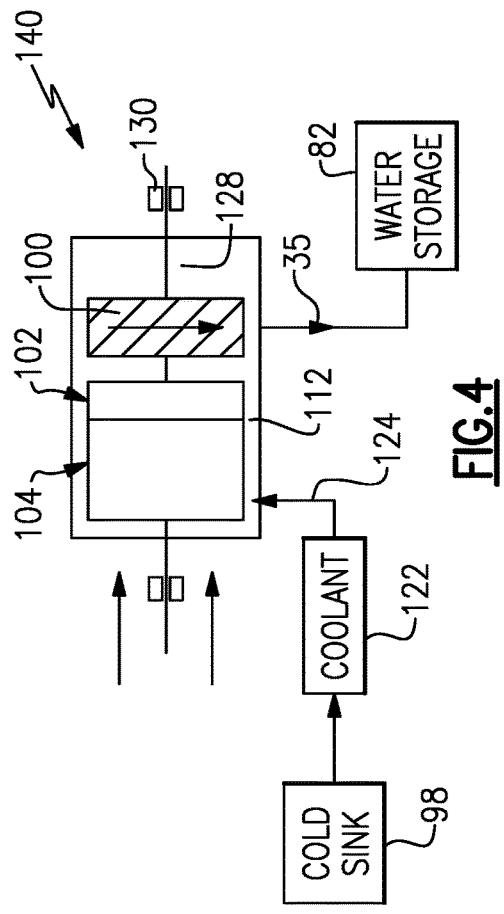
FIG. 4 is a schematic view of another example condenser embodiment.

Referring to FIG. 4, another example condenser embodiment is schematically shown and indicated at 140. The example condenser 140 includes the same features as the previously described condenser 80 but does not include the motor 132. Instead, the condenser 140 uses the axial momentum of the high energy exhaust gas flow 55 to drive rotation of the plurality of rotating passages 100. The rotating passages 100 are spiral shaped such that as the axial gas flow 55 impacts sides of the passages 100, an auto rotation is induced that provides the desired centrifugal forces to separate the liquids as a water flow. The passages 100 are supported on the shaft 128 and bearings 130 and uses the inherent momentum of the gas flow 55 to drive rotation.

It should be understood that it is within the contemplation of this disclosure that the rotating passages 100 may be configured to auto rotate in some engine operating conditions according to the example described in FIG. 4 and also may include a motor 132 to drive rotation in other operating conditions. Accordingly, the motor 132 may be provided and used only during specific operating conditions where the momentum of the gas flow 55 may not provide the desired magnitude of centrifugal force.

Figure 5:
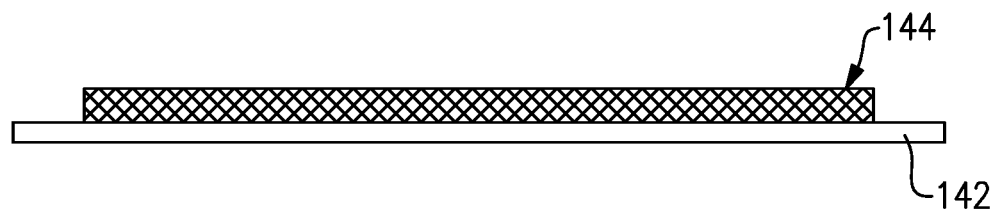
FIG. 5 is a side schematic view of a surface coating of the example condenser.

Referring to FIG. 5, surfaces 142 of the passages 100 may be provided with a coating 144 that aids in the condensation of water from the gas flow 55. In one disclosed example embodiment, the coating 144 comprise a hydrophilic material. In another disclosed example embodiment, the coating 144 comprises a hydrophobic material. Still in another disclosed example embodiment, the coating 144 may be a pattern of alternating sections made from a hydrophobic material and other sections including hydrophilic material to drive and gather condensate from the gas flow 55.

Figure 6:
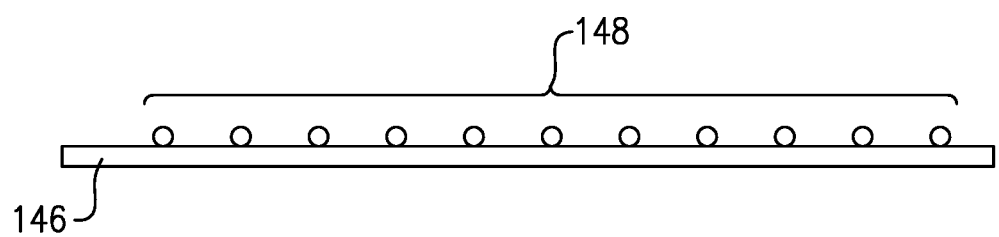
FIG. 6 is a side schematic view of an example textured surface of the example condenser.
Figure 7:
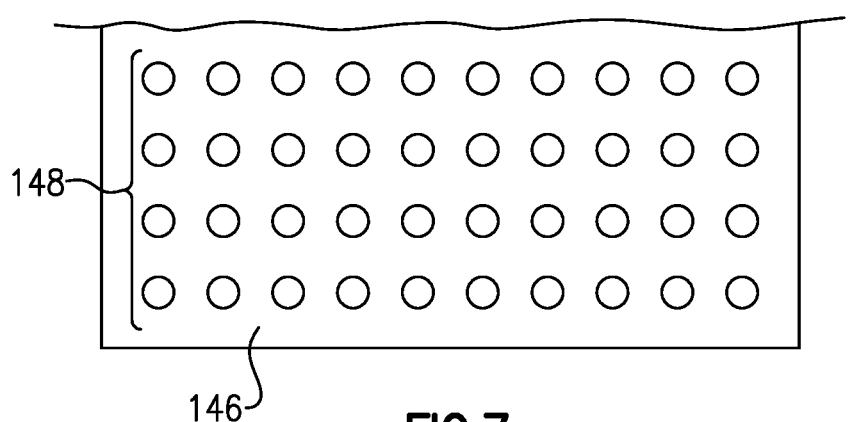
FIG. 7 is a top schematic view of the example texture surface.

Referring to FIGS. 6 and 7, surfaces 146 within the example condensers 80, 140 maybe textured to enhance thermal transfer into the gas flow 55. In one disclosed example, the surfaces 146 include a texture 148 formed from a plurality of raised bumps. The texture 148 may be configured to induce a turbulent flow near the surfaces 146 to enhance thermal transfer and thereby accelerate cooling and liquid extraction.

Accordingly, the example condensers 80, 140 provide for the transformation of water in gas form within the gas flow into liquid water that is then separated and stored for injection back into the engine to improve overall propulsive system efficiency.

Although an example engine configuration is described by way of example, it will be appreciated that other engine configurations may include additional structures and features and are within the contemplation and scope of this disclosure.

Accordingly, the disclosed assemblies provide for the advantageous use of ammonia fuel to improve engine efficiency and reduce carbon emission. The disclosed systems use the advantageous thermal capacity of ammonia to maximize the recapture of heat and cool other working flows of the engine.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A propulsion system for an aircraft comprising:
   a core engine including a core flow path where air is compressed in a compressor section, communicated to a combustor section, mixed with a hydrogen based fuel and ignited to generate a high energy gas flow that is expanded through a turbine section;
   a hydrogen fuel system configured to supply hydrogen fuel to the combustor through a fuel flow path;
   a condenser arranged along the core flow path and configured to extract water from the high energy gas flow, the condenser including a plurality of rotating passages disposed in a collector, wherein the passages are configured to rotate about a condenser axis to generate a transverse pressure gradient to direct water out of the high energy gas flow toward the collector; and an evaporator arranged along the core flow path and configured to receive a portion of the water extracted by the condenser to generate a steam flow, wherein the steam flow is injected into the core flow path upstream of the turbine section.

2. The propulsion system as recited in claim 1, wherein the condenser is configured to receive a cooling flow to cool the high energy gas flow.

3. The propulsion system as recited in claim 2, wherein the condenser is configured to receive the cooling flow at a location along an outer periphery.

4. The propulsion system as recited in claim 2, wherein the plurality of rotating passages comprise a plurality of spiral layers extending axially about a condenser axis.

5. The propulsion system as recited in claim 4, wherein the plurality of spiral layers include openings configured to exhaust water collected from the high energy gas flow to the collector.

6. The propulsion system as recited in claim 4, wherein the condenser includes a plurality of axial passages and a plurality of transition passages for directing the high energy gas flow into the rotating passages.

7. The propulsion system as recited in claim 1, including a shaft disposed along the condenser axis for supporting rotation of the rotating passages.

8. The propulsion system as recited in claim 7, including a motor coupled to the shaft and configured to drive rotation of the rotating passages.

9. The propulsion system as recited in claim 7, wherein the plurality of rotating passages is configured to rotate about the shaft in response to an axial momentum of the high energy gas flow.

10. The propulsion system as recited in claim 1, wherein the plurality of rotating passages include a hydrophilic coating.

11. The propulsion system as recited in claim 1, wherein the plurality of rotating passages include a hydrophobic coating.

12. The propulsion system as recited in claim 1, wherein the plurality of rotating include a textured surface.

13. The propulsion system as recited in claim 1, including a water storage tank and the collector is configured to communicate water extracted from the high energy gas flow to the water storage tank.

14. A water recovery system for an aircraft propulsion system, the water recovery system comprising:

a condenser arranged along a core flow path of the aircraft propulsion system and configured to extract water from a high energy gas flow, the condenser including a plurality of rotating passages disposed in a collector, wherein the passages are configured to rotate about a condenser axis to generate a transverse pressure gradient to direct water out of the high energy gas flow toward the collector;

a water storage tank in communication with the collector configured to receive water extracted from the high energy gas flow to the water storage tank; and at least one water pump for communicating water from the water storage tank to the aircraft propulsion system.

15. The water recovery system as recited in claim 14, wherein the condenser is configured to receive a cooling flow to cool the high energy gas flow within the plurality of rotating passages.

16. The water recovery system as recited in claim 14, wherein the plurality of rotating passages defined between a plurality of curved layers extending axially and curving about a condenser axis.

17. The water recovery system as recited in claim 14, including a shaft supporting the plurality of rotating passages for rotation about the condenser axis.

18. The water recovery system as recited in claim 17, including a motor coupled to the shaft to drive rotation of the plurality of rotating passages.

19. The water recovery system as recited in claim 14, wherein the plurality of rotating passages include at least one of a hydrophilic coating, a hydrophobic coating or a textured surface.

20. A method of operating an aircraft propulsion system comprising:

generating a high energy gas flow that includes water;

removing water from the high energy gas flow by directing the high energy gas flow through at least one of a plurality of rotating passages to generate a transverse pressure gradient to direct water out of the high energy gas flow toward a collector of a condenser, the collector surrounding the plurality of rotating passages;

generating a steam flow from water removed from the high energy gas flow with an evaporator located within the flow path upstream of the condenser and downstream of the combustor; and injecting the generated steam within the flow path.

* * * * *